Patented June 4, 1935

2,003,867

UNITED STATES PATENT OFFICE 2,003,867

METHOD OF MAKING CRYSTALLINE ALUMINA AND A COMPOSITION OF MATTER CONTAINING THE SAME

Raymond R. Ridgway, Niagara Falls, N. Y., assignor to Norton Company, Worcester, Mass., a corporation of Massachusetts

REISSUED

No Drawing. Application September 22, 1933, Serial No. 690,589

25 Claims. (Cl. 23—142)

This invention relates to the electrochemical manufacture of crystalline alumina of required chemical and physical properties for use in various industrial arts.

In the electrometallurgical production of crystalline alumina from alumina-containing ores, such as bauxite, the elimination of the impurities of the ore by reduction with carbon has had serious limitations, from the standpoint of purity and stability of the resultant alumina crystals. Commercial bauxite contains as high as 4% of titania and 2% of zirconia, as well as silica and alkaline metal oxides. It has been customary to purify the aluminum oxide incompletely and to leave contaminating metal oxide impurities in the fused bath to serve as a buffer, which protects the alumina from reduction. In accordance with the prior methods, such as described in the patent to Saunders No. 1,269,224, bauxite may be greatly enriched in its alumina content by fusion with carbon and iron in a Higgins type of electric furnace, as shown in the United States Patent No. 775,654, and the purification may be carried on easily up to about 96½% alumina. As an example of a calcined bauxite ore before and after reduction by fusion with carbon, the following analyses are to be noted:

|  | Original ore | Reduced ore |
|---|---|---|
|  | Per cent | Per cent |
| Aluminia | 80.0 | 96.5 |
| Titania | 3.0 | 1.5 |
| Zirconia | 0.6 | 0.2 |
| Silica | 5.5 | 0.5 |
| Iron Oxide | 10.0 | 0.2 |
| Alkaline metal oxides | 0.9 | 1.1 |

Up to this degree of purity, aluminum carbide or other reduction compounds of alumina are not formed to any material extent. On the other hand, various impurities present are combined in a slag or glass phase, which surrounds and cements together the crystals of alpha alumina, and some of this glass appears as an inclusion in the alumina crystals.

An alternative procedure, as employed to reduce the last trace of titania, is to over-purify the alumina by various methods and then to oxidize the aluminum carbide, or other reduced aluminum compounds thus produced, by treating the original furnace melt with various solid and gaseous reagents. Also, such an over-purified and reduced mass has been treated after solidification by available means which serve to remove impurities, but such products must thereafter be re-fused in order that the purified crystalline alumina may have the desired physical as well as chemical characteristics. These alternative methods, which involve over-purification and reduction of some of the alumina in the original furnacing of bauxite, have not produced in practice the desired results, since the oxidizing agents have remained as contaminations in the final product, or else the reactions have been incomplete. Moreover, those processes which involve an intermediate purification and a subsequent second fusion of the material are expensive and involve great technical difficulties. There has been no practical method for converting an impure alumina, such as bauxite, to a high purity crystalline alumina of the required physical structure by means of a single furnacing process.

In accordance with the U. S. patent to Ridgway and Glaze No. 1,719,131, a high purity alumina may be obtained by the use of a limited quantity of iron sulfide which is so proportioned with respect to the carbon reducing agent as to produce a small quantity of hydrolyzable aluminum sulfide in the melt. This causes a complete removal of the titania and zirconia during the reduction process, but requires the presence of the unstable aluminum carbide in solid solution in the alumina. In order to remove this aluminum carbide, as well as the droplets of ferro-alloy, the fused material has to be cooled rapidly to produce minute crystals of the order of 0.1 mm. and then be broken up by hydrolysis to a very fine subdivision so as to expose the impurities. Consequently, the resultant disintegrated crystals have been too fine in size to be of direct commercial use, and it has been necessary to re-melt the alumina, after the impurities have been separated therefrom, and to recrystallize the product in a slower cooling operation to obtain crystals of commercial sizes.

The final ingot of crystalline alumina, as produced by such prior processes, is a massive solid body which requires expensive crushing and screening operations to obtain grains of the desired sizes. The requirements of the various abrasive and refractory industries call for grain sizes ranging ordinarily from 8 meshes to the linear inch to the very fine flours, but the maximum requirements are within the range of grit sizes 30 to 60, with the largest demand for grit size 40. The standard operation of breaking the ingot into large lumps, sorting out the various impurities, and then crushing these lumps in a rock crusher to the required sizes, and finally screening the material to obtain the different grades, has involved not only a large expense but also a loss of a considerable amount of very fine material which had to be thrown away or else returned to the furnace to be remelted and recrystallized.

The primary object of this invention is, therefore, to overcome such problems and to provide a single, direct furnacing treatment for bauxite or other impure aluminous ores, which results in the production of coarse sized crystals of alumina of a high degree of purity and chemical stability, which have the physical or structural characteristics required in the various industries.

A further object is to produce crystalline alumina grains of usable commercial sizes in which each grain is a discrete particle consisting of a single large crystal or aggregates of large crystals, which are substantially free from unstable, reduced inclusions and are not contaminated with other metal oxides.

A further object is to provide a method of directly melting and purifying bauxite which does not require intermediate chemical purification processes or multiple furnacing operations and which will produce alumina substantially free from titanium and zirconium compounds, as well as the alkali metal and alkaline earth metal impurities, which are normally present in the crude ores. Other objects will be apparent in the following disclosure.

In accordance with my discovery, I have found that the impurities in bauxite or other alumina-bearing materials, such as diaspore, calcined alunite, etc., may be readily removed by a single, direct furnacing operation and that the product may be readily disintegrated into crystal particles of a high purity, above 96½% by weight of alumina, the major portion of which are larger than 100 grit size and which may be made large enough to meet the average or maximum requirements of the industry. The purification is achieved by introducing into the original bauxite or the furnace melt a reagent comprising the sulfide of an alkali metal or alkaline earth metal, herein termed as an "alkaline metal sulfide", such as CaS, which is capable of and proportioned for changing the crystallizing ability of the alumina and reacting with the residual slag product resulting from the reduction of the metal oxide impurities so as to completely free the crystals of alumina from included material, whether oxidized or reduced, and to segregate the residual materials into a matrix phase surrounding crystals of alumina of commercially usable sizes. The matrix phase may include in addition to the water-soluble alkaline sulfide a disintegrating agent, such as a small quantity of a hydrolyzable or water soluble sulfide, which is capable of causing rapid disintegration of the ingot when treated with a suitable agent, such as water. Aluminum sulfide is such a hydrolyzable material, it being converted to aluminum hydrate by reaction with water. The required sulfides may be formed by adding iron sulfide to the melt and adjusting the ratio thereof to the amounts of alkaline metal compound and reducing agent added, as explained herein. This chemically unstable matrix is easily converted into a soluble and hydrolyzed form that is readily adapted to separation from the pure crystals of alumina. Since the matrix may be used as a very small proportion of the total melted product, such as 3% or less, it may be discarded without serious economic loss. The reagents added to the melt are so proportioned as to provide an absolute control of the reactability of the matrix and, therefore, its removal.

For example, I may fuse bauxite, or other suitable crude alumina, in the presence of a reducing agent, such as carbon, which is proportioned to reduce the metal oxide impurities, and with metallic iron, which forms a desired ferro-alloy with metals of the oxide impurities, these reagents being proportioned to reduce the refractory oxides, as above explained, and produce alumina of a maximum purity of 96½%. In order to purify the alumina further and cause it to crystallize as desired, I also include in the melt a small amount of an alkaline metal sulfide capable of forming a glassy matrix which carries and thus removes from the fused alumina the unreduced compounds of zirconium, titanium, silicon and other metal impurities which do not form a ferroalloy. The ingot is easily disintegrable because of the presence of the alkaline metal sulfide, but if desired the matrix glass may comprise the water hydrolyzable aluminum sulfide to hasten the decomposition. The alkaline metal sulfide may be formed from its corresponding oxide and the aluminum sulfide from the alumina in the bath by the addition of ferrous sulfide and carbon in suitable proportions. The required quantity of sulfide or sulfides, as herein defined, or reagents capable of developing the same, may be added to the furnace charge either before fusion or at any time up to that at which the purification has reached the state indicated in the second column of the above table. After the fusion of the furnace charge, it is slowly cooled in a large mass by allowing the ingot to stand at room temperature and dissipate its heat after the furnace shell has been removed therefrom and without the aid of a cooling medium, except the water which was employed to cool the iron shell of the Higgins' furnace during the fusion stage, thus forming large crystals.

The presence of an alkaline metal sulfide in proper amount serves: (1) to prevent the formation of aluminum carbide in the crystalline alumina; (2) to cause the impure metal oxides which normally dissolve in the alumina to separate into the matrix phase and to provide a low melting matrix of such a character as to permit the free growth of alpha alumina crystals; and (3) to promote the decomposition of the alumina ingot by the presence of a sufficient but small amount of unstable material adapted for this purpose, and particularly a water-soluble glass. It is a feature of this process that the impurities, which are not included in the ferroalloy at the bottom of the melt, are included in the water-soluble glass so that, when treated with water, these impurities are segregated from the crystalline alumina and may be freely washed therefrom. The alkaline earth impurities are converted to sulfides and these, as well as that part of the silica, titania and zirconia or other refractory oxides present and which are not reduced and converted to sulfides, will segregate into and be carried by the sulfide matrix. The molten matrix should be highly fluid so as to cause a free separation of the metal and the slag layers from the alumina and permit the growth of alumina crystals to a large size, whereby the slag or glassy phase is found outside of well formed polyhedral alumina crystals which are devoid of inclusions of droplets of metal or of the glassy phase, to any material extent.

The water-soluble glass phase may be produced by reactions within the melt, rather than by a simple addition of suitable sulfides; and to this end, I may add to the charge of bauxite a reagent metal sulfide, such as ferrous sulfide, together with carbon and one or more of the oxides of the alkaline metals, in suitable proportions, so that there is formed within the alumina melt a glass-like matrix, which is capable of holding in solution or suspension the unreduced titanium, iron and zirconium compounds and the alkaline metal impurities originally present in the bauxite. If desired, the required sulfides may be preformed outside of the furnace and then added directly to the charge, providing that sufficient reagent metal sulfide is supplied in addition to take care of the alkaline constituents already present in the bauxite and form alkaline metal sulfide therewith. This reagent metal sulfide is preferably added in amount sufficient to form aluminum sulfide as well as the alkaline metal sulfide.

Of the alkaline metal sulfides which may be employed, I preferably use, because of considerations of low cost and workability in the process, the sulfides of sodium, magnesium and calcium, herein termed "alkaline metal sulfides" and which may be formed by adding to the bauxite charge or to the molten bath the oxides of these respective metals. I may, however, employ the oxides or sulfides of other metals of the first and second periodic groups, and particularly of that group consisting of sodium, potassium, magnesium, calcium, barium, and strontium. These may be added in various forms. For example, sodium may be used in the inexpensive form of soda ash or sodium aluminate. Magnesia may be added as calcined magnesite, and calcium may be used in the form of calcined limestone. Combinations of these materials may be used, such as is found in calcined dolomite containing the oxides of both magnesium and calcium.

For the reagent metal sulfide employed to bring about the sulfidization of the constituents in the melt which are to be removed from the alumina and to form the water-soluble glass, I select those metal sulfides which can be reduced by the metal of the alkaline metal oxide which is in turn reduced by the carbon during the furnacing operation. That is, if calcium oxide is employed and the carbon serves to reduce the same to calcium metal, the reagent metal sulfide, such as iron or copper sulfide, should be one which stands below the alkaline metal in the reduction scale and thus be capable of transferring its sulfur content to form calcium sulfide. The choice of these reagent metal sulfides is dependent upon their availability and the permissible constituents of the alloy which is to be formed in the alumina melt. Of these sulfides, I prefer to use iron sulfide, and it may be employed in the form of ferrous sulfide, iron pyrites or pyrrhotite or other suitable carrier of iron. If copper sulfide is employed, and it is to be considered as an equivalent of iron sulfide, then suitable minerals containing the came may be used for the purpose. A combination of both iron and copper, which is suitable, is found in chalcopyrite. The expression "reagent metal sulfide" as used in the claims is to be interpreted as limited to either iron sulfide or copper sulfide and their equivalents. As a result of the furnace reduction process, the iron sulfide is converted to iron metal which alloys with other reduced metals, and the sulfur goes into the glassy matrix.

As specific examples illustrating the application of this invention to bauxite ores, the following procedure may be adopted for treating a bauxite which may be within the composition limits indicated in the following table:

| | Per cent by weight |
|---|---|
| Alumina | 78 to 82 |
| Titania | 2.8 to 3.4 |
| Zirconia | 0.4 to 1.0 |
| Silica | 5.0 to 6.0 |
| Iron oxide | 6.0 to 12 |
| Calcium oxide | 0.2 to 0.7 |
| Magnesia | 0.1 to 0.4 |

The carbon requirements for the reduction of the impurities in this bauxite are calculated as molecular equivalents thereof, according to the well-known reactions which involve reducing the oxides to the metals. An ore of the above composition limits will require from 4.5 to 7.0% of carbon for reducing the impurities in the fused ore, depending on the combinations and the amount of impurities which may be present. Carbon must also be provided to reduce the oxides of the alkaline metals. The carbon addition is so adjusted relative to the other reagents that the difficulty reducible oxides will appear as sulfides rather than as aluminates and so go with the matrix and not be found as inclusions in the alumina. Also, if aluminum sulfide is to be produced in the melt, carbon must be present in amount sufficient to reduce enough alumina to form the $Al_2S_3$. The amount of carbon actually added will depend upon various other factors, such as the ratio of the electrode cross-section to furnace size and the operating voltage of the furnace, as well as the losses due to oxidation in the air, all of which is well within the skill of one who is familiar with the operation of a furnace of this type.

Iron pyrites is preferably used as the reagent metal sulfide, and for the alkaline metal oxide I preferably use soda ash, magnesia or lime. Examples of compositions and proportions by weight which are satisfactory for producing a high purity alumina are given in the following tables:

*Example A*

| | Parts |
|---|---|
| Bauxite | 74 |
| Metallic iron | 15 |
| Coke | 6 |
| Iron pyrites | 4 |
| Soda ash | 1 |

*Example B*

| | Parts |
|---|---|
| Bauxite | 75 |
| Metallic iron | 15 |
| Coke | 5½ |
| Iron pyrites | 4 |
| Magnesia | ½ |

*Example C*

| | Parts |
|---|---|
| Bauxite | 75 |
| Metallic Iron | 15 |
| Coke | 5 |
| Iron pyrites | 4 |
| Lime | 1 |

A mixture of the bauxite and reagents in suitable proportions may be charged into an open-topped, water-cooled electric furnace of the Higgins type. The rate of feed of the charge to the furnace may be suitably adjusted to the power rating of the furnace on the basis of from 0.5 to 1.0 kilowatt hour per pound of mixture fed. After the material has become completely fused, the furnace shell is removed and the ingot is allowed to cool slowly by radiation at room temperature. The rate of cooling will largely determine the size of the crystal particles but under the conditions specified, the disintegrated particles will be larger than 100 grit size and ordinarily close to the requirements of the industry. A typical example of crystal particle sizes resulting from the use of 1% of lime and 5% of pyrites comprises substantially the following percentages of grit sizes, as measured by the particles held on screens of the meshes per linear inch as indicated:

| Screen size | 10 | 24 | 44 | 66 | 100 | Finer than 100 |
| --- | --- | --- | --- | --- | --- | --- |
| Percentage held | 13.5 | 6.3 | 39.8 | 21.9 | 10.7 | 7.8 |

It is feasible to carry on this operation in a tapping furnace only if the scale of operations is particularly large, to provide for slow cooling in the ladle. In that case, the tapped ingot should not be less than several tons in size, so as to be sufficient to prevent oxidation of the molten material as it flows from the furnace, since the margin of reduction is delicately balanced in the furnace charge. After the melt has been cooled slowly so as to form large crystals, the shell is removed and exposes a well fused ingot. This is broken up into large lumps in the usual manner and separated from the outer layer of incompletely reacted material which forms the crucible for the melt and is called refuse, as well as the metal layer which contains iron alloyed with silicon and titanium. The operation of breaking and sorting the material is carried on while the ingot is still warm so as to avoid any difficulty with hydrolysis at this stage.

In order to disintegrate the mass, the lumps which have been sorted free of refuse and from the layer of reduced ferro-alloy in the bottom of the ingot are placed preferably in a large rotating cylinder or tube with a considerable quantity of water, and the ends of the tube are sealed against the escape of the hydrogen sulfide gas which is liberated by the hydrolysis of the aluminum sulfide and alkaline earth metal polysulfides. This gas dissolves in the water and aids in carrying into solution the alkaline earth metal sulfides or hydrosulfides. The tube is preferably provided with baffles in order to stir the material and shower it into the bath of water therein, thus aiding in breaking up or disintegrating the mass. Owing to the alkaline metal sulfides going into solution and the aluminum sulfide being converted to the hydroxide and swelling greatly because of the chemical change, the lumps are rapidly and completely broken down to expose the individual crystals or crystal aggregates where they were separated by the matrix. At the same time, the stable sulfides are set free and appear in the resultant sludge. Thereafter the suspended impurities are drawn off and the alumina crystals are washed with water.

As the result of this procedure, the material is now found to be in the form of discrete particles of crystalline alumina accompanied by a sludge carrying the refuse, such as the matrix glass and the impurities entrained therein. The aluminum sulfide has hydrolyzed to aluminum hydroxide which swells rapidly and aids in breaking up the mass. The soluble alkaline metal sulfides have gone into solution in the water. The stable material, such as free sulfur and the unreduced oxides and sulfides of titanium, iron and zirconium which are present in the matrix glass, has been set free and is in suspension in the liquid in a very fine state of subdivision. Any silicon sulfide which formed has volatilized and disappeared from the melt. After this disintegration has been completed, the solution containing the suspended matter is withdrawn, and the alumina crystals are washed with water to remove the adhering sludge. The crystalline alumina granules thus produced are ready for use in various industries; but they may be further treated to purify them, such as by passing the material over a magnetic separator to remove an occasional globule of ferro-alloy which may be present, or by treatment with suitable chemical reagents to remove traces of alkali or other objectionable compounds. The sludge obtained by the disintegration of the ingot is found to be commercially valuable in that it contains a large amount of titanium and zirconium sulfides in a highly concentrated form.

A typical analysis of a product resulting from the furnace melt before it is disintegrated with water is as follows:

| | Per cent |
| --- | --- |
| Crystalline $Al_2O_3$ | 95 to 97.5 |
| Ti calculated as $TiO_2$ | 0.5 to 1.5 |
| Zr calculated as $ZrO_2$ | 0.2 to 1.0 |
| Si calculated as $SiO_2$ | nil to 0.2 |
| Fe calculated as $Fe_2O_3$ | 0.05 to 0.3 |
| Total sulfide sulfur | 1.0 to 2.0 |
| Water hydrolyzable sulfur | 0.3 to 0.6 |
| Sulfur as soluble sulfides (alkaline earth or alkali metal) | 0.3 to 1.0 |

After the disintegrated crystalline alumina has been thoroughly washed, a typical produce will analyze as follows:

| | Per cent |
| --- | --- |
| $Al_2O_3$ | 99.64 to 98.9 |
| $TiO_2$ | 0.2 to 0.6 |
| $SiO_2$ | nil |
| $Fe_2O_3$ | 0.05 to 0.1 |
| $ZrO_2$ | 0.05 to 0.2 |
| $CaO$ | 0.02 to 0.1 |
| $MgO$ | 0.04 to 0.1 |
| $Na_2O$ | nil |

A typical analysis of the sludge and of the solution resulting from the agitation of the material with water, where the alkaline metal reagent was lime, is as follows:

| Sludge | Solution |
| --- | --- |
| Per cent | Per cent |
| Loss 25.3 | S 13.8 |
| Fe 2.7 | Ba 4.3 |
| Ti 13.2 | Ca 32.6 |
| Zr 10.5 | Mg 3.0 |
| S 14.3 | |
| Al 9.5 | |
| Ca 3.0 | |
| Mg 5.0 | |

It is within the scope of this invention to complete the normal purification obtained by a standard carbon reduction process which does not employ any sulfide or alkali. In that case, and just before the shut-down of the furnace run, the required quantities of alkali metal and sulfide reagents are added to the melt to change the nature of the inter-granular glass to a water-soluble compound. The final product is the same as if the addition had been made to the original furnace charge. It will, therefore, be readily apparent that my discovery comprises the fact that a small amount of alkali metal or alkaline earth metal sulfide together with a trace of aluminum sulfide will alter the normal intergranular matrix of an aluminous melt of high purity so that the matrix may be easily removed by water solution and hydrolysis.

The proportions of the ingredients of the furnace charge may be varied, depending upon the required physical and chemical characteristics, as herein explained. The total amount of the water hydrolyzable aluminum sulfide is held normally at less than 3%, and preferably less than 2%, of the total mass. This prevents the loss of any large quantity of the pure alumina into the glassy matrix which is to be rejected, as well as the consumption of large amounts of energy and raw materials in the process. The alkaline metal sulfide is likewise present in a small amount only sufficient to accomplish its purposes, and particularly to prevent the formation of aluminum carbide and reduce the solubility of the alumina in the glassy matrix, as well as to assist in segregating the titanium, zirconium and other impurities into the liquid phase of slag. It is ordinarily desirable that the alkaline metal sulfide constitute not over 3% of the total mass. The alkaline metal addition may, however, be increased to five parts, with a corresponding increase in the coke addition, without seriously upsetting the necessary reactions. It is, however, preferable to maintain the total sulfide content below 2%, and ordinarily about or below 1% of the total mass; hence the various additions will be so proportioned as to attain this result. If the alkaline addition is large, a correspondingly large amount of carbon and iron sulfide must be added to the charge to convert all of the alkali or alkaline earth material to the sulfide. The additions of the reagents should be carefully controlled, since there is a strong tendency for the alkali and alkaline earth metal, which is present in the ordinary aluminous ore or is added to the charge, to react with the more acidic alumina and produce aluminates and spinels which contaminate the crystalline alumina. These are stable under the conditions required for crystallization of the melt, and do not go into solution when an attempt is made to disintegrate the glassy matrix with water. Also, the presence of too large an amount of iron sulfide interferes with the reduction reactions. Some sulfur is lost by direct oxidation; hence, the actual amount of sulfur which is required to be fixed in the glassy matrix is very small. Only so much iron sulfide should be added as will serve to provide the required amount of total sulfur in the melt; and this control is necessary to prevent the formation of over 2 or 3% of aluminum sulfide.

It is possible to so control the addition of the carbon reducing agent that the resultant crystalline alumina grains derived from the disintegrated product will be completely stable and not require any further treatment to remove impurities therefrom. In the methods employed heretofore, the formation of an unstable aluminum carbide has been unavoidable where a high purification has been accomplished. When more carbon than that required for the reduction of the impurities is added to an aluminous melt, then in a case where iron is present as a lower layer of molten ferro-alloy, a certain fraction of the excess carbon goes to increase the content of the difficultly reducible metals, such as aluminum, in that ferro-alloy. Accordingly, a distribution of reduced compounds of aluminum takes place in the furnace whereby such compounds are found in both the slag and the metal. If, however, the sulfide addition is made to the furnace in accordance with this invention, the sulfide sinks into the metal layer and acts to alter this equilibrium in such a direction that the reduced compounds are converted to sulfides and are transferred from the metal layer to matrix glass.

It is found that the carbide and suboxide of aluminum, as well as those of the alkali and alkaline earth metals, which are present in the supernatant slag layer before the addition of the reagent sulfides, form a constituent which reacts with the sulfides or the product of the sulfidization of the metal layer to convert them from the objectionable carbide and suboxide to the removable sulfide. The completion of this adjustment is facilitated by the presence of appreciable percentages of alkaline earth metals which serve as carriers for the sulfide constituents. Since aluminum carbide cannot exist in the presence of the sulfide of the alkali metal or alkaline earth metal, then it may be considered that the alkaline metal sulfide in the matrix glass acts as a buffer in the melt against the over-reduction of the alumina. This particular buffer material is, however, easily removed from the final product, as compared with other types of materials, such as silica, which have been heretofore suggested for re-oxidization of the over-reduced alumina and have resulted in contaminating the final melt with the reduction product of the oxidizing agent, such as silicon or ferro-silicon. The matrix glass which is produced in accordance with the present invention is completely extractable by the water solution. Hence, the reduction of the alumina can be completely neutralized without interfering with the quality of the purified alumina.

As the alkaline ratio in the water-soluble glass is increased, the crystals of resultant pure alpha alumina tend to become more sharp and angular and to develop into silver and plate-like formations. Magnesium and sodium in particular tend to produce these platy crystals. Also the larger the percentage of the water-soluble glass in the melt, the greater is the tendency to produce a grain which is punctured with intra-crystal voids and stringers which tend to produce a weak shape. In order to produce grains which tend towards being equi-dimensional in shape or are of a blocky, chunky, cubical or polyhedral type, the alkaline metal addition should be kept below 1% of the total weight of materials used, for the bauxite ore above specified.

The matrix may be considered as made up of hydrolyzable aluminum sulfide, the water-soluble alkaline metal sulfides or polysulfides, together with an excess of free sulfur and the insoluble or stable sulfides of iron, titanium and zirconium and the other entrained solid materials. It is important that the matrix should respond properly to the water-hydrolysis treatment; otherwise, the objectionable impurities cannot be readily removed from the crystalline alumina. A means of chemical control of the composition of the matrix is provided by determining the ratio between the water-hydrolyzable sulfides, the water-soluble sulfides, and the stable sulfides. My experiments have demonstrated that there are certain limits in the ratio of these three types of sulfides making up the total sulfur content which determine whether the glassy matrix will readily hydrolyze or not. These are such that the stable sulfides should comprise not more than 50% of the total glassy matrix while the water-hydrolyzable and the soluble sulfides comprise not less than 50%. A satisfactory decomposition of the glass is produced when the three constituents are distributed as follows:

| | Per cent by weight |
|---|---|
| Water-hydrolyzable sulfides | 25 to 40 |
| Water-soluble sulfides | 25 to 70 |
| Stable sulfides | 0 to 35 |

If there is a maximum of not over 2% of total sulfide sulfur content in the alumina melt, then this distribution assures ready decomposition or disintegration of the mass, although the total percentage of glass is a very small fraction of the total melt.

It is at once apparent that ordinarily less than 1% of the original alumina will be converted into the hydrolyzed form and appear as an impurity in the sludge which makes up the rejected portion of the melt. If one attempts to increase the content of aluminum sulfide in the melt by increasing largely the addition of the reagent iron sulfide and varying the corresponding requirements of the carbon reducing agent, this results in the reduction and waste of a large amount of alumina to take up the sulfide content as aluminum sulfide. This procedure also requires large percentages of coke in order to bring about the necessary reduction reaction to form the sulfides of the glassy matrix. When the concentration of the reducing agent is sufficient to reduce enough alumina to combine with a large amount of sulfide present, and if sufficient carbon is provided to reduce the difficultly reducible alkaline metal oxides, whereby they may be converted into soluble sulfides instead of aluminates, the carbon requirement is sufficient to supply the melt with a certain percentage of aluminum carbide which goes into the alumina crystal and makes it unstable and unsuitable for use as a discrete crystal of alpha alumina.

Also, large additions of reducing agents cause an increased loss of aluminum by volatilization, by reduction into the ferro-alloy, and by formation of compounds, such as aluminum carbide and sulfide. If the amount of this is appreciable, the entire reaction changes in its nature and the character of the crystallization changes, while the alumina crystals take on inclusions of unstable compounds. It is, therefore, apparent that the practical requirements of this process are attained only when the iron sulfide, the reducing agent and the alkaline metal additions are so carefully limited as to produce the desired water-soluble matrix glass without having an excess of alkali metal or alkaline earth metal present to produce aluminate or an excess of aluminum sulfide with its corresponding carbide requirements. It is, therefore, desirable that the percentages of the ingredients be suitably proportioned, within the limitations above indicated, to insure a successful production of not only a substantially pure alumina particle but also that the ingot of crystalline material may be readily disintegrated into the discrete particles of required size.

These percentages as herein specified refer to the percentage distribution of the total sulfide content or to the amount of sulfur present as a sulfide and not to the amounts of the various metal sulfides used.

Having thus described the invention, what is claimed as new and desired to secure by Letters Patent is:

1. The process of producing crystalline alumina in large discrete particles by a single furnacing operation from impure aluminous ores containing one or more of the oxides of silicon, titanium and zirconium, comprising the steps of melting and purifying the alumina in an electric furnace at a high temperature by means of a carbonaceous reducing agent and a limited quantity of alkaline metal sulfide which are so proportioned that the solidified melt will consist of crystallized alumina held in a matrix of a water soluble and/or hydrolyzable glass containing the residual unreduced titanium, zirconium and iron impurities, and slowly cooling the melt to produce large crystals of alumina and thereafter disintegrating the solidified mass by dissolving and/or hydrolyzing the glass and separating the alumina crystals from the impurities.

2. The process of producing crystalline alumina in large discrete particles by a single furnacing operation from impure aluminous ores containing one or more of the oxides of silicon, titanium and zirconium, comprising the steps of melting and purifying the alumina in an electric furnace at a high temperature by means of a carbonaceous reducing agent and metallic iron addition adjusted to produce a purity of at least 96.5% alumina in the furnace melt and in the presence of such a limited quantity of alkaline metal oxide and iron sulfide together with carbon for reducing the same that the solidified melt will consist of crystallized alumina held in a matrix of water soluble and/or hydrolyzable glass containing the residual unreduced titanium, zirconium and iron impurities, and slowly cooling the melt so that the crystalline alumina will have a grain size larger than 100 grit, and thereafter disintegrating the solidified mass by dissolving and/or hydrolyzing the glass and separating the alumina crystals from the impurities.

3. The method of making crystalline alumina of commercial grit sizes from impure alumina, comprising the steps of fusing the alumina with a reducing agent and in the presence of an alkaline sulfide which is capable of and is proportioned in amount less than 5% of the total mass for preventing the formation of reduction products of aluminum without forming an alkaline metal aluminate and causing the impurities to separate from the alumina as a slag phase containing the sulfides and other compounds of the impurity metals, so that the alumina may crystallize freely to a desired crystal size within a melt of purified alumina.

4. The process of producing crystalline alumina in large discrete particles by a single furnacing operation from impure aluminous ores containing one or more of the oxides of silicon, titanium, zirconium, calcium and magnesium, comprising the steps of melting and purifying the alumina in an electric furnace at a high temperature by means of a carbonaceous reducing agent and a limited quantity of alkaline metal sulfide which are so proportioned that a matrix is formed of residual, difficultly reducible and non-reducible impurity constituents in a form lending itself to the complete crystallization of the alumina in large grit sizes without forming a stable alkaline aluminate, the total sulfide sulfur of the matrix constituting less than 3% by weight of the melt, and slowly cooling the melt to produce large crystals of alumina and thereafter disintegrating the solidified mass by dissolving and/or hydrolizing the glass by means of water and separating the alumina crystals from the impurities.

5. The method of making granular crystalline alumina from an impure alumina containing one or more of the oxides of silicon, titanium, zirconium, calcium and magnesium, comprising the steps of melting the alumina with carbon, iron sulfide and an additional alkaline metal oxide which are proportioned for reducing all of the impurity metal oxides and forming a ferro-alloy therewith and for producing a matrix, the sulfide sulfur content of which constitutes not over 3% of the total mass, and which contains alkaline metal sulfide in amount sufficient to prevent the presence of aluminum carbide and to cause the residual impurity metals to gather largely in the matrix, thereafter cooling the melt slowly to form an ingot containing large alumina crystals interpersed with veins of the matrix, breaking up the ingot and treating it with water to dissolve the soluble alkaline metal sulfide and hydrolze any aluminium sulfide present and thereby disintegrating the ingot into discrete crystalline alumina grains of sizes which are directly commercially usable for varied abrasive purposes.

6. The process of removing traces of partially or difficultly reducible metal oxide impurities from a melt of alumina formed by the reduction of bauxite with carbonaceous reducing agents comprising the steps of incorporating in the furnace charge an easily reducible metal sulfide and an alkaline metal oxide and adjusting the sulfur content of the mixture so that after fusion and cooling the metal oxide impurities will be separated into a water-soluble or hydrolyzable matrix, the sulfide sulfur content of which is not over 2% by weight of the total melt.

7. The process of further purifying fused alumina beyond the quality obtainable by carbon reduction in the presence of a ferro-alloy layer which comprises the step of incorporating in the furnace charge an easily reducible sulfide and an alkaline metal compound together with carbon which are capable of and are proportioned for converting the traces of the remaining impurities into a water-soluble and disintegrable glassy matrix containing not more than 3% by weight of aluminum sulfide and an alkaline metal sulfide.

8. The method of claim 2 in which the furnace charge comprises the oxide of sodium, calcium or magnesium and ferrous sulfide added in such proportions, with respect to the amount of reducing agent added, that a matrix is formed which includes both the hydrolyzable aluminum sulfide and a water-soluble alkaline metal sulfide and is capable of disintegrating the mass when treated with water, and the total sulfide content is less than 5% by weight of the melt.

9. The method of purifying an alumina bearing ore containing silica, titania or zirconia comprising the steps of melting it with carbon and metallic iron under conditions of over-purification which serve to reduce substantially all of the metal oxide impurities and to form aluminum carbide, providing within the melt sufficient alkaline metal sudfide, below 5% by weight of the total mass, to convert to aluminum sulfide the reduced alumina compounds and form a glassy matrix which segregates the metal oxide impurities from the alumina, cooling the mass and crystallizing the alumina, and thereafter disintegrating the mass by treatment with water and recovering the alumina crystals free from the matrix.

10. The method of claim 2 in which the solidified ingot is crushed and treated with water in a closed chamber to cause the disintegration of the ingot, after which the alumina crystals are separated from the solution and solid residue.

11. The method of claim 4 in which the alkaline metal sulfide is a sulfide of sodium, potassium, calcium, magnesium, barium or strontium.

12. The method of beneficiating the zirconium and titanium content of bauxite comprising the steps of claim 2 in accordance with which the zirconium and titanium are largely separated into the matrix, after which the ingot is treated with water to dissolve the soluble glass and leave the insoluble titanium and zirconium oxides and sulfides in the sludge which is thereafter separated from the solution and alumina for further treatment.

13. The method of making crystalline alumina comprising the steps of electrically fusing a charge including impure alumina, carbon, iron, sulfur and an alkaline metal proportioned to yield a disintegrating product containing alumina together with a matrix having from 25 to 40% by weight of a water hydrolyzable sulfide, 25 to 70% of a water soluble sulfide and zero to 35% of a stable sulfide, and in which the total sulfide sulfur content of the matrix is not over 2% of the whole melt, thereafter cooling the mass to form crystalline alumina, and treating the mass with water to disintegrate the same into crystal particles of alumina and a solution and sludge containing the sulfides and other impurities.

14. The method of producing crystalline alumina from an impure alumina in which the alumina is melted with reduction agents which separate the impurities therefrom comprising the steps of incorporating in the melt an alkaline metal compound and a reagent metal sulfide capable of providing a highly fluid, disintegrable glassy matrix, said ingredients being proportioned to form a sulfide matrix constituting not over 5% by weight of the melt and containing not over 50% by weight of stable sulfides and not less than 50% of water-soluble and hydrolyzable sulfides, and thereafter treating the mass with a reagent capable of disintegrating and separating the alumina crystals from the matrix.

15. The method of claim 2 in which the glassy matrix contains from 25 to 40% of water-hydrolyzable sulfides, 25 to 70% of water-soluble sulfides and not over 35% of stable sulfides.

16. The method of claim 2 in which the total sulfide sulfur content of the melt is not over 2% by weight and the glassy matrix contains from 25 to 40% of water-hydrolyzable sulfides, 25 to 70% of water-soluble sulfides and not over 35% of stable sulfides.

17. The method of claim 14 in which a calcium compound capable of forming calcium sulfide is the alkaline metal reagent.

18. The method of claim 14 in which a sodium compound capable of forming sodium sulfide is the alkaline metal compound.

19. The method of claim 14 in which a magnesium compound capable of forming magnesium sulfide within the melt is the alkaline metal compound.

20. The method of making an aluminous ingot comprising the steps of fusing bauxite with carbon and iron together with a metal oxide of the alkaline metal group, consisting of sodium, calcium and magnesium oxides, and with an easily reducible metal sulfide of the group consisting of iron and copper sulfides, in which the ingredients are so proportioned as to produce a hydrolyzable and decomposable matrix of alkaline metal and aluminum sulfides, the sulfide sulfur content of which is not over 3% by weight of the total melt, cooling the fused mass slowly to form an ingot containing said sulfides separated from alumina crystal particles of high purity, the major portion of which are larger than 100 grit size and a considerable portion is larger than 44 grit size, said ingot being capable of disintegration by water or other hydrolyzing agent or solvent which attacks the matrix.

21. The method of purifying alumina containing metal oxides comprising the steps of fusing it with a reducing agent and a reagent metal sulfide and crystallizing the material in an ingot in accordance with the steps of claim 12, and thereby providing a decomposable glassy matrix containing a metal sulfide which separates discrete crystals of alumina, and thereafter breaking the ingot into lumps and treating them in a closed chamber with sufficient water to disintegrate them and to dissolve the hydrogen sulfide formed by the reaction.

22. As a composition of matter, a solidified ingot of fused alumina comprising discrete crystal particles having a content of over 96.5% by weight of alumina which are cemented together by a glassy matrix consisting largely of alkaline metal sulfides and aluminum sulfide together with compounds of titanium and zirconium.

23. A composition of the type covered by claim 22 in which the ingot after disintegration by water comprises crystal particles, the major portion of which are large as 44 grit size.

24. As an article of manufacture, a solidified ingot containing large discrete crystals of alpha alumina of a purity in excess of 96.5% cemented together by a disintegratable glassy matrix containing a large proportion of calcium, sodium or magnesium sulfide combined with compounds of aluminum, titanium and/or zirconium, and in which the total sulfide sulfur content is not over 2% by weight of the ingot and the ingot is disintegratable by solution or hydrolysis of the matrix in water.

25. As an article of manufacture, a solidified ingot containing upwards of 85% of pure crystalline alumina as discrete crystals in commercial grain sizes loosely cemented with a disintegratable matrix containing the sulfide of an alkaline metal associated with compounds of titanium and zirconium and in which the matrix contains from 25 to 40% by weight of aluminum sulfide, 25 to 70% of alkaline metal sulfide and zero to 35% of stable sulfides, and the total sulfide sulfur content is not over 3% by weight of the whole ingot.

RAYMOND R. RIDGWAY.